United States Patent
Banerjee et al.

(10) Patent No.: US 11,144,656 B1
(45) Date of Patent: Oct. 12, 2021

(54) SYSTEMS AND METHODS FOR PROTECTION OF STORAGE SYSTEMS USING DECOY DATA

(71) Applicant: CA, INC., San Jose, CA (US)

(72) Inventors: Ashok Banerjee, Redwood City, CA (US); William Porr, Berkeley, CA (US); Sahil Hasan, Saratoga, CA (US)

(73) Assignee: CA, INC., San Jose, CA (US)

( * ) Notice: Subject to any disclaimer, the term of this patent is extended or adjusted under 35 U.S.C. 154(b) by 282 days.

(21) Appl. No.: 16/362,987

(22) Filed: Mar. 25, 2019

(51) Int. Cl.
*G06F 21/62* (2013.01)
*G06F 21/56* (2013.01)
*G06F 21/60* (2013.01)

(52) U.S. Cl.
CPC ........ *G06F 21/6209* (2013.01); *G06F 21/568* (2013.01); *G06F 21/602* (2013.01)

(58) Field of Classification Search
CPC ... G06F 21/6209; G06F 21/568; G06F 21/602
See application file for complete search history.

(56) References Cited

U.S. PATENT DOCUMENTS

| | | | | |
|---|---|---|---|---|
| 8,549,643 B1* | 10/2013 | Shou | ..................... | G06F 21/556 726/23 |
| 8,640,247 B2* | 1/2014 | Cohen | ..................... | G07F 7/084 726/26 |
| 2003/0195852 A1* | 10/2003 | Campbell | ............... | G06F 21/10 705/51 |
| 2006/0212698 A1* | 9/2006 | Peckover | ................ | G06F 21/10 713/151 |
| 2010/0077483 A1* | 3/2010 | Stolfo | ................. | H04L 63/1466 726/24 |
| 2011/0307705 A1* | 12/2011 | Fielder | ............... | G06F 21/6209 713/181 |
| 2017/0195364 A1* | 7/2017 | Levin | .................. | H04L 63/1491 |
| 2018/0324214 A1* | 11/2018 | Schoenherr | ........... | G06F 21/552 |

OTHER PUBLICATIONS

"Developments of the Honeyd Virtual Honeypot", URL: http://www.honeyd.org/, 2008, 2 pages.

* cited by examiner

*Primary Examiner* — Vance M Little
(74) *Attorney, Agent, or Firm* — Foley & Lardner LLP

(57) ABSTRACT

The disclosed computer-implemented method for protection of storage systems using decoy data may include identifying an original file comprising sensitive content to be protected against malicious access and protecting the sensitive content. Protecting the sensitive content may include (i) processing the original file to identify a structure of the original file and the sensitive content of the original file, (ii) generating a decoy file using the structure of the original file and using substitute content in a location corresponding to the sensitive content of the original file, and (iii) storing the decoy file with the original file. Various other methods, systems, and computer-readable media are also disclosed.

20 Claims, 7 Drawing Sheets

SYSTEMS AND METHODS FOR PROTECTION OF STORAGE SYSTEMS USING DECOY DATA

BACKGROUND

Data storage systems, also referred to as storage systems, may refer to integrated hardware and software systems used to store and manage data. Components of storage systems may include, without limitation, applications, databases, backup devices, and cloud storage. Technical advances have led to an increased capacity for devices to store large volumes of data in complex data storage systems. Data storage systems may be vulnerable to attacks by malicious users due to the size and complexity of storage systems. For example, access of the storage system by an unauthorized user may be undetected and the extent of the access may be difficult to determine. Conventional techniques to thwart intruders of a data storage system may include storing an attractively-named file (e.g., indicating that the file contains sensitive content) in the storage system to distract the intruder. In some examples, the attractively-named file may not contain content that the intruder is seeking and may be easily discarded or ignored by the intruder, rendering the tactic ineffective to protect the files of the storage system. The present disclosure, therefore, identifies and addresses a need for systems and methods for protection of storage systems using decoy data.

SUMMARY

As will be described in greater detail below, the present disclosure describes various systems and methods for protection of storage systems using decoy data.

In one example, a method for protection of storage systems using decoy data may include (i) identifying, by a computing device, an original file comprising sensitive content to be protected against malicious access and (ii) protecting the sensitive content by (a) processing the original file to identify a structure of the original file and the sensitive content of the original file, (b) generating a decoy file using the structure of the original file and using substitute content in a location corresponding to the sensitive content of the original file, and (c) storing the decoy file with the original file.

In some examples, the method may further include determining that the decoy file has been accessed. In response to determining that the decoy file has been accessed, the computing device may perform a security action to protect a storage system where the original file is located. The security action may include at least one of displaying, to an administrator of the storage system, an alert indicating that the decoy file has been accessed, moving the original file from a current location in the storage system, encrypting the original file and the decoy file in the storage system, terminating a session of a user accessing the decoy file, suspending credentials of the user accessing the decoy file, or activating data love prevention protocols.

In some examples, generating the decoy file using the structure of the original file and using the substitute content may include obtaining a user preference indicating a ratio of the original file to a number of decoy files and generating, based on the ratio, a plurality of decoy files using the structure of the original file and using with the substitute content in the location corresponding to the sensitive content of the original file.

In some examples, processing the original file to identify the structure of the original file and the sensitive content of the original file may include identifying an entity associated with the sensitive content, wherein the entity is indicative of a category of sensitive content and identifying a location associated with the entity of the sensitive content. Generating the decoy file using the structure of the original file and using the substitute content in the location corresponding to the sensitive content of the original file may include (i) generating the decoy file using the structure of the original file, (ii) generating the substitute content based on the entity of the sensitive content, and (iii) inserting the substitute content at the location associated with the entity of the sensitive content in the decoy file. In some examples, the method may include generating a token based on the entity of the sensitive content and substituting the sensitive content with the token at the location of the entity in the original file. Determining that the decoy file has been accessed may include at least one of (i) identifying that a user opened the decoy file, (ii) identifying that the user copied the decoy file, or (iii) identifying that the user deleted the decoy file.

In one example, a system for protection of storage systems using decoy data may include at least one physical processor and physical memory that includes computer-executable instructions that, when executed by the physical processor, cause the physical processor to (i) identify an original file comprising sensitive content to be protected against malicious access and (ii) protect the sensitive content. The computer-executable instructions may cause the physical processor to (i) process the original file to identify a structure of the original file and the sensitive content of the original file, (ii) generate a decoy file using the structure of the original file and using substitute content in a location corresponding to the sensitive content of the original file, and (iii) store the decoy file with the original file.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify an original file comprising sensitive content to be protected against malicious access and (ii) protect the sensitive content. The one or more computer-executable instructions may cause the computing device to (i) process the original file to identify a structure of the original file and the sensitive content of the original file, (ii) generate a decoy file using the structure of the original file and using substitute content in a location corresponding to the sensitive content of the original file, and (iii) store the decoy file with the original file.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
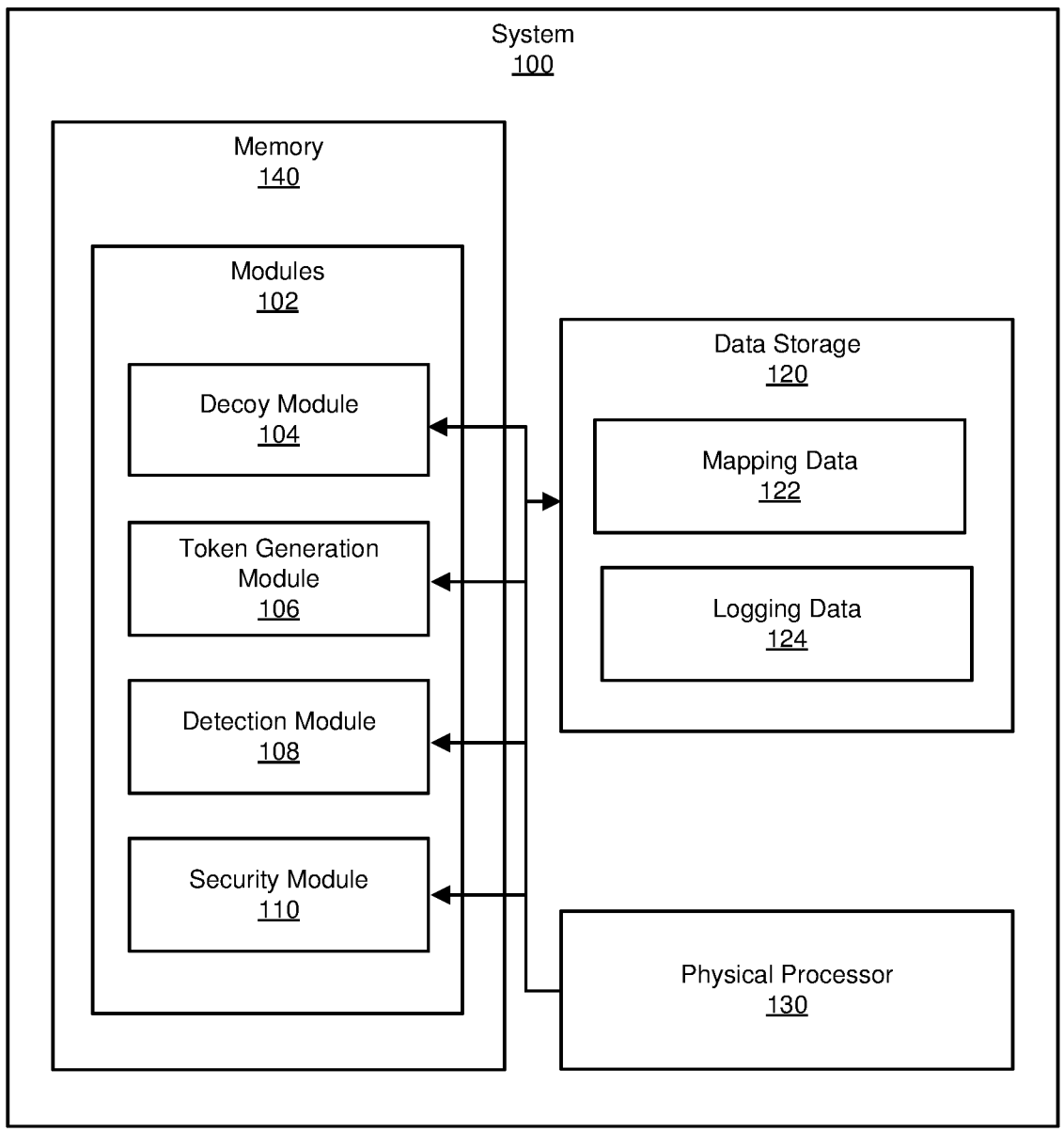
FIG. 1 is a block diagram of an example system for protection of storage systems using decoy data.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protection of storage systems using decoy data. As will be described in greater detail below, the systems and methods described herein may generate decoy files that are morphologically similar to the original files in a storage system. The decoy files may be generated to appear structurally similar to the original files and may store decoy data that mimics the appearance of the sensitive content in the original files. Storing the decoy files with the original files may increase the difficult of locating the original files containing the sensitive content because, the decoy files appear to be indistinguishable from the original files.

The systems and methods described herein may process original files to identify a structure of the original file and location of sensitive content entities that are to be replaced by decoy data in the decoy files. Sensitive content entities may be categories or classifications associated with sensitive content in the original file. Examples of sensitive content entities may include, without limitation, names, dates, credit card numbers, social security numbers, phone numbers, street addresses, zip codes, emails, IP addresses, and the like. The sensitive content entities may be detected using a combination of known techniques, such as regular expressions, database cross-referencing, and/or natural language processing algorithms.

When an authorized user wants to perform some action with the original file, they may initiate a command to generate a list that includes only the original files in a current directory of the storage system. To utilize the command, the authorized user may need to authenticate themselves to the storage system using a security protocol, such as two-factor authentication. The list of original files may be stored on a separate system outside of the data storage system for additional security or to a different, limited access location in the data storage system. Access to the list of original files may require further authentication by an authorized user.

When an unauthorized user gains access to the storage system, they will be presented with both original and decoy files. The system may detect that someone has interacted with one or more decoy files. Upon detecting unauthorized access of the decoy files, security actions may be performed to safeguard the original files. For examples, the security action may include moving the original files from a current location in the data storage system, terminating the session of the unauthorized user, suspending the access credentials of the unauthorized user, encrypting the original files, or the like.

Figure 2:
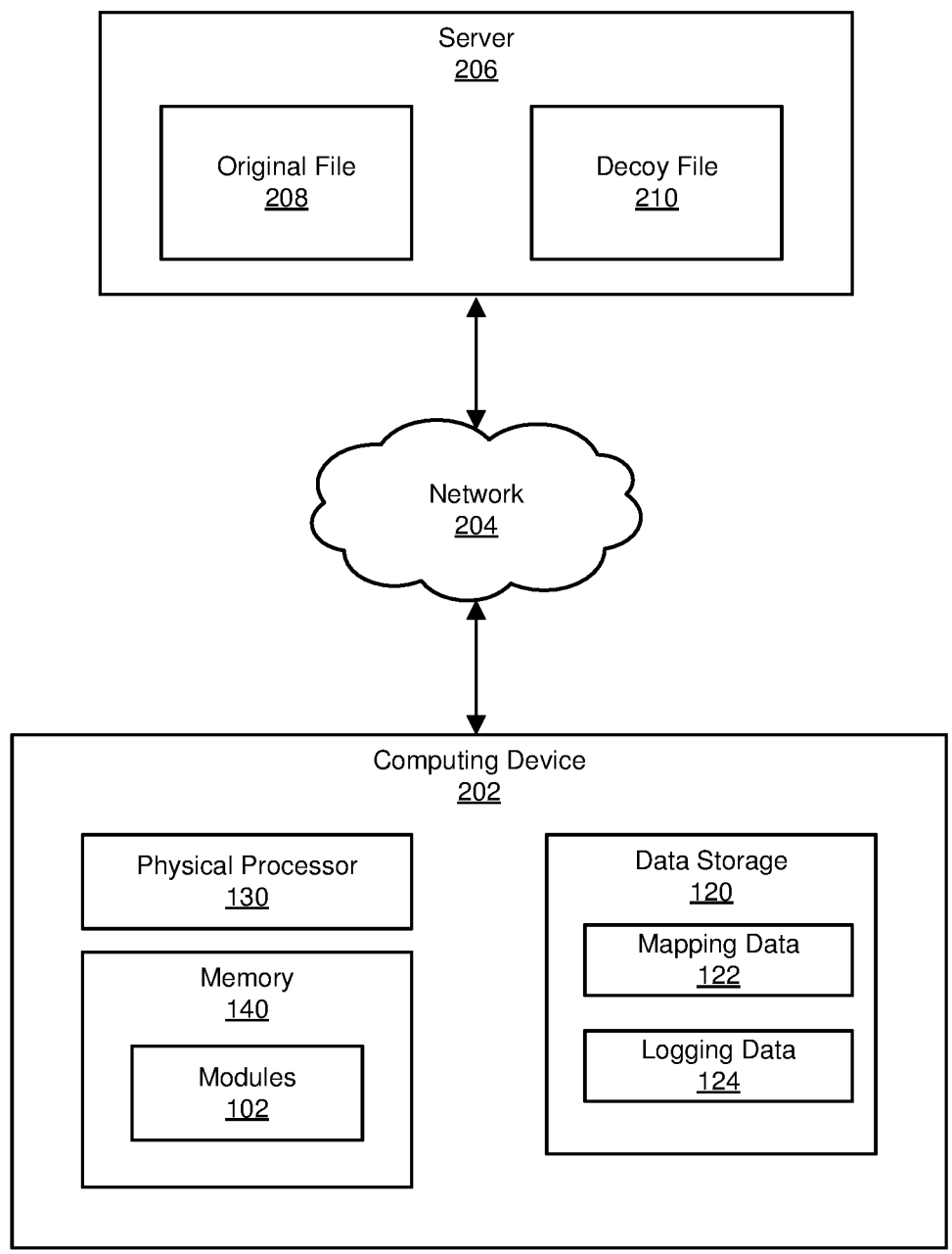
FIG. 2 is a block diagram of an additional example system for protection of storage systems using decoy data.

The following will provide, with reference to FIGS. 1-2, detailed descriptions of example systems for protection of storage systems using decoy data. Detailed descriptions of corresponding computer-implemented methods will also be provided in connection with FIGS. 3-4. A detailed description of data flow through the example system for protection of storage systems using decoy data will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for protection of storage systems using decoy data. As illustrated in this figure, example system 100 may include one or more modules 102 for performing one or more tasks. As will be explained in greater detail below, modules 102 may include a decoy module 104, a token generation module 106, a detection module 108, and a security module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of the modules 102 may represent modules stored and configured to run on one or more computing devices, such as the devices illustrated in FIG. 2 (e.g., computing device 202 and/or server 206). One or more of the modules 102 in FIG. 1 may also represent all or portions of one or more special-purpose computers configured to perform one or more tasks.

As illustrated in FIG. 1, the example system 100 may also include one or more memory devices, such as memory 140. The memory 140 generally represents any type or form of volatile or non-volatile storage device or medium capable of storing data and/or computer-readable instructions. In one example, the memory 140 may store, load, and/or maintain one or more of the modules 102. Examples of the memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, the example system 100 may also include one or more physical processors, such as physical processor 130. The physical processor 130 generally represents any type or form of hardware-implemented processing unit capable of interpreting and/or executing computer-readable instructions. In one example, the physical processor 130 may access and/or modify one or more of the modules 102 stored in memory 140. Additionally, or alternatively, the physical processor 130 may execute one or more of the modules 102 to facilitate protection of storage systems using decoy data. Examples of the physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, the example system 100 may also include data storage 120. The data storage 120 generally represents any type or form of computing device capable of data storage. In one example, the data storage 120 may store mapping data 122 and/or logging data 124.

The example system 100 in FIG. 1 may be implemented in a variety of ways. For example, all or a portion of the example system 100 may represent portions of example system 200 in FIG. 2. As shown in FIG. 2, the system 200 may include a computing device 202 in communication with a server 206 via a network 204. In one example, all or a portion of the functionality of the modules 102 may be performed by the computing device 202, the server 206, and/or any other suitable computing system. As will be described in greater detail below, one or more of the modules 102 from FIG. 1 may, when executed by at least one processor of the computing device 202 and/or the server 206, enable the computing device 202 and/or the server 206 to use decoy data to protect storage systems. For example, and as will be described in greater detail below, one or more of the modules 102 may cause the computing device 202 and/or the server 206 to identify an original file comprising sensitive content to be protected against malicious access and protect the sensitive content. The sensitive content may be protected by processing the original file to identify a structure of the original file and the sensitive content of the original file. A decoy file may be generated using the structure of the original file and using substitute content in a location corresponding to the sensitive content of the original file. The decoy file may be stored with the original file.

The computing device 202 generally represents any type or form of computing device capable of reading computer-executable instructions. For example, the computing device 202 may include an endpoint device (e.g., a mobile computing device) running client-side security software capable of initiating the generation and management of decoy files used to protect storage systems. Additional examples of the computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The server 206 generally represents any type or form of computing device that is capable of reading computer-executable instructions. In one example, the server 206 may represent a server capable of implementing and managing storage systems. The storage systems may store original files 208 of the storage system and decoy files 210 used to deter malicious attacks and protect the storage system. Additional examples of the server 206 include, without limitation, security servers, application servers, web servers, storage servers, and/or database servers configured to run certain software applications and/or provide various security, web, storage, and/or database services. Although illustrated as a single entity in FIG. 2, the server 206 may include and/or represent a plurality of servers that work and/or operate in conjunction with one another.

The network 204 generally represents any medium or architecture capable of facilitating communication or data transfer. In one example, the network 204 may facilitate communication between the computing device 202 and the server 206. In this example, the network 204 may facilitate communication or data transfer using wireless and/or wired connections. Examples of the network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
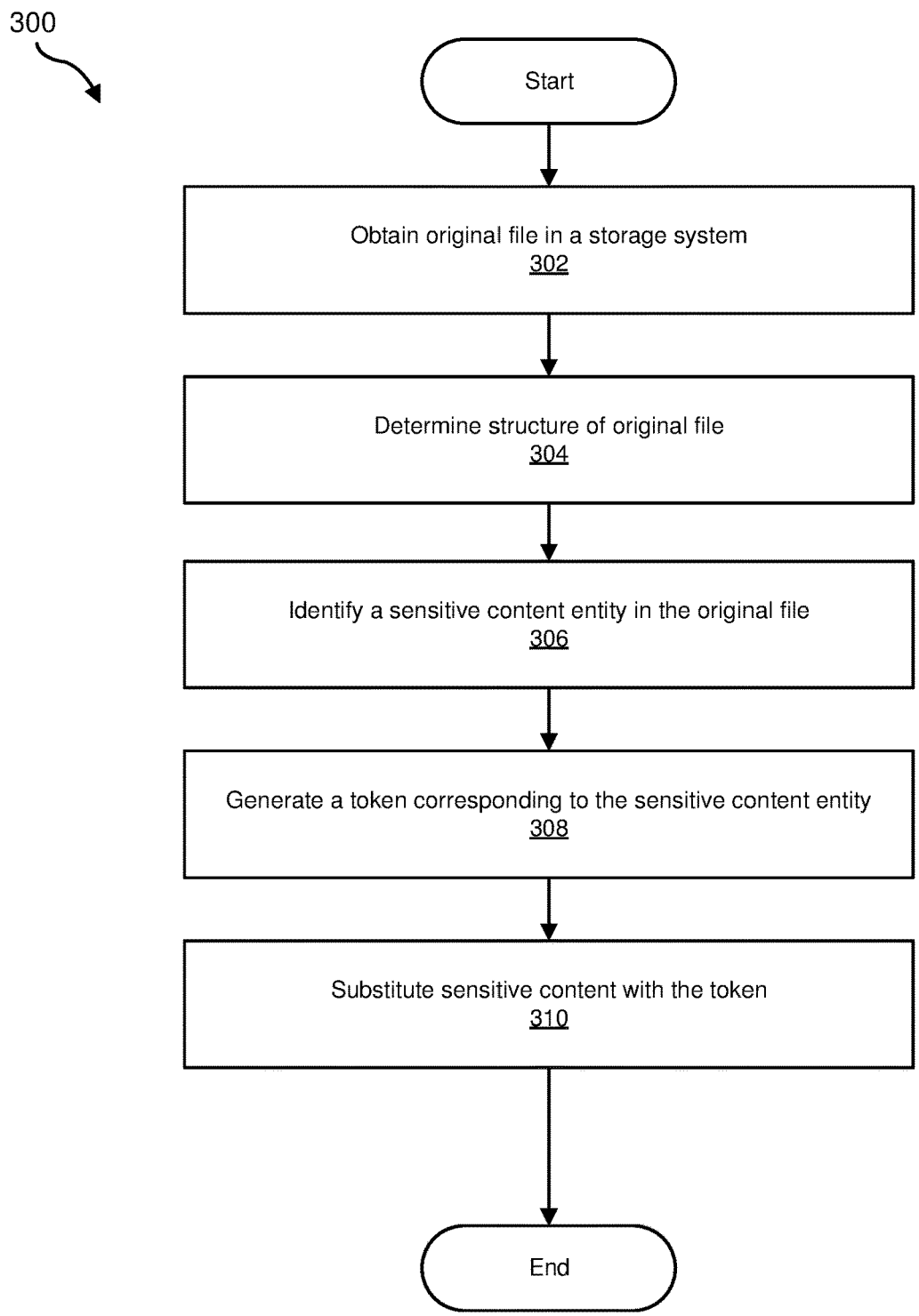
FIG. 3 is a flow diagram of an example method for protection of storage systems using decoy data.

FIG. 3 is a flow diagram of an example computer-implemented method 300 for protection of storage systems using decoy data. The steps shown in FIG. 3 may be performed by any suitable computer-executable code and/or computing system, including the system 100 in FIG. 1, the system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may obtain an original file 208 in a storage system. The system may obtain the original file in any suitable manner. For example, the decoy module 104 may, as part of computing device 202 in FIG. 2, receive a location of the original file 208 from a user of the data storage system, determine a location of the original file 208 using a search or query of the system, or the like.

The term "original file," as used herein, generally refers to any type of data file that may include sensitive content and be stored in a storage system. In some examples, the original file may be a file with an identified structure that is used to store information about a person or entity. Examples of an original file may include, without limitation, documents related to financial services (e.g., credit card application, mortgage application, financial statements, etc.), documents associated with organizations, (e.g., profit statement, financial disclosures, etc.), and the like.

The term "sensitive content," as used herein, generally refers to any type of data file that may include data that may be categorized as confidential or classified data. Examples of sensitive content include, without limitation, personally identifiable information, data to which access is restricted by law or regulations of an organization, trade secret, or the like.

At step 304, one or more of the systems described herein may determine the structure of the original file 208. The system may perform this step in any suitable manner. For example, the decoy module 104 may process the original file 208 to obtain data associated with the structure of the original file 208. In some examples, the decoy module 104 may parse the original file 208 to obtain the structure of the original file 208. In some examples, the decoy module 104 may use different techniques, such as natural language processing algorithms, regular expressions, and the like, to determine the structure of the original file 208.

The term "structure of a file," as used herein, generally refers to any type of information that may be indicative of a type of file, an arrangement, organization, and/or presentation of data in the file, or the like. The structure of a file may include, without limitation, style of the data (e.g., font, size, etc.), organization of data (e.g., lists, block, paragraph), location of data, and the like.

In some examples, the decoy module 104 may parse markup data of the original file 208 to obtain the structure of the original file 208. The markup data of a file may be a standardized set of notations stored in the file and used to annotate the structure and/or the presentation of the content of the file. The markup data (also referred to as a markup language) of the file may be embedded in the file and may be used to annotate a file in a manner that is syntactically distinguishable from the content of the file. The markup data may not be visible to the end-user and may provide instructions for programs that are able to process and present the content of the file to an end-user. The decoy module 104 may parse the markup data of the original file 208 and generate data indicative of the structure of the original file 208, such as the arrangement, organization, and/or presentation of the data in the original file 208. The decoy module 104 may flag locations of different types of data in the content of the original file 208.

At step 306, one or more of the systems described herein may identify a sensitive content entity in the original file 208. The system may identify the sensitive content entity in any suitable manner. For example, the decoy module 104 may parse the original file 208 and may identify entities in the content in the original file 208. The decoy module 104 may determine which of the entities of the content are sensitive content entities and the location of the sensitive content entities in the original file 208.

The term "entity," as used herein, generally refers to a category or classification of data that may be associated with some of the content of a file. A sensitive content entity may be an indication that the associated content is sensitive content or includes sensitive content. Examples of entities include, without limitation, personally identifiable information (e.g., first name, last name, address, email, etc.), financial information (e.g., balance sheet, cash flow statement, income statement, etc.), identifiers (e.g., social security number, tax identifier, email address, etc.), payment information (e.g., credit card information, bank account information, online money transfer service credentials, etc.), dates, and the like. Entities of data may be identified using different techniques, such as applying rules indicating format or structure of the data, using natural language processing to identify entities from content, and/or obtaining information from the markup of a file that denotes the presence and location of an entity.

Using a set of rules, the decoy module 104 may identify a sensitive content entity from the content of the original file 208. For example, a rule may indicate that a string of numbers in the following format XXX-XX-XXXX may be a social security number. The decoy module 104 may flag the identified social security number as a sensitive content entity and flag the location of the sensitive content entity. In another example, a rule may indicate, based on formulas or rules provided by a financial institution, that a string of numbers may be a credit card number. The decoy module 104 may flag the identified credit card number as a sensitive content entity and flag the location of the sensitive content entity. The decoy module 104 may identify the sensitive content entity of the content in the original file 208 and may flag the location of the sensitive content entity.

At step 308, one or more of the systems described herein may generate a token corresponding to the sensitive content entity. The system may perform this step in any suitable manner. For example, the decoy module 104 may transmit the data associated with the sensitive content entity to the token generation module 106. The token generation module 106 may receive the sensitive content entity data and may generate a token using the sensitive content entity data.

The term "token," as used herein, generally refers to a non-sensitive equivalence of sensitive content that may be mapped or linked to the sensitive content that it is replacing or substituting. The token may have no extrinsic or exploitable meaning or value. Tokens may be used to protect sensitive content by mimicking the sensitive content in presentation. Using tokens as decoy data in files may the decoy files 210 more difficult to distinguish from original files 208.

The token generation module 106 may receive the sensitive content entity and the location of the sensitive content entity from the decoy module 104. The token generation module 106 may generate a token using any known methods of token generation. The tokens may be generated by the token generation module 106 based on a level of randomness and/or contextual restrictions, which may be designated by an administrator or inferred from the sensitive content. For example, if the sensitive content entity is an address, a level of randomness may be set to generate decoy addresses using a specific city or state. If the sensitive content entity is a name, the token generation module 106 may determine that the sensitive content is a name for a woman who lives in the United States. The token generation module 106 may use a data set, such as U.S. census data, to generate a decoy female name likely used in the United States, whereas if the sensitive content is a name for a woman from Singapore, a different data set may be used to generate a female name from the geographical region.

In some examples, the token generation module 106 may generate a token based on rules associated with the sensitive content entity. For example, if the entity of the sensitive content entity indicates that the sensitive content is a credit card number, the token generation module 106 may use a set of formulas or rules provided by a credit card provider, to generate a decoy credit card number that appears to be valid and consistent with a real credit card number. Likewise, if the entity of the content indicates that the sensitive content entity is a social security number, rules may indicate that the decoy social security number must conform to a specific format.

In some examples, the token generation module 106 may generate mapping data 122 linking the token and the sensitive content of the original file 208. The mapping data 122 may also indicate all the locations in the original file 208 that the sensitive content was substituted using the token. The mapping data 122 may be referenced by the token generation module 106 to ensure consistent substitution of sensitive content with the generated token throughout the original file 208 and/or related files. The mapping data 122 may be stored in a separate location than the original file 208, such as in a system outside of the storage system. This may prevent unauthorized users from accessing the sensitive content safeguarded through the tokenization process. In some examples, the mapping data 122 may be stored in a secure location of the storage system with limited access and additional security measures. The mapping data 122 may also be secured using known encryption and security techniques.

At step 310, one or more of the systems described herein may substitute the sensitive content of the original file 208 with the generated token. The system may perform this step in any suitable manner. For example, the decoy module 104 may, as part of computing device 202 in FIG. 2, receive the token from the token generation module 106. The decoy module 104 may replace the sensitive content with the token, using the identified the location of the entity of the sensitive content. In some examples, the original file 208 may include formulas that may depend on the sensitive content (e.g., profit statements, date calculations, etc.). The decoy module 104 may recalculate values in the original file 208 using the received token and then store the original file 208. Thus, the original file 208 has been modified by replacing sensitive data with tokens. The modification of the original file 208 ensures that even if a malicious user accesses the original file 208, the content stored in the original file 208 is decoy data (e.g., token), and the sensitive data is safely stored in the mapping data 122.

In some examples, an authorized user may wish to access the original file 208. The authorized user may authenticate themselves using known security protocols, such as two factor authentication or the like. Upon authentication, the authorized user may request to access the original file 208. The decoy module 104 may receive the request to access the original file 208. The decoy module 104 may transmit the request to the token generation module 106. The token generation module 106 use the mapping data 122 to restore the sensitive content throughout the original file 208 prior to presenting the original file 208 to the user. Thus, the user may view and interact with the sensitive content of the original file 208.

In some examples, the user may make modifications to the original file 208. The decoy module 104 may process modified original file 208 and the token generation module 106 may generate new tokens and/or update the mapping data 122 to capture any modifications made by the user. Prior to storing the original file 208 in the storage system, the decoy module 104 and the token generation module 106 may substitute tokens in place of the sensitive content and then save the modified original file 208 in the storage system.

Figure 4:
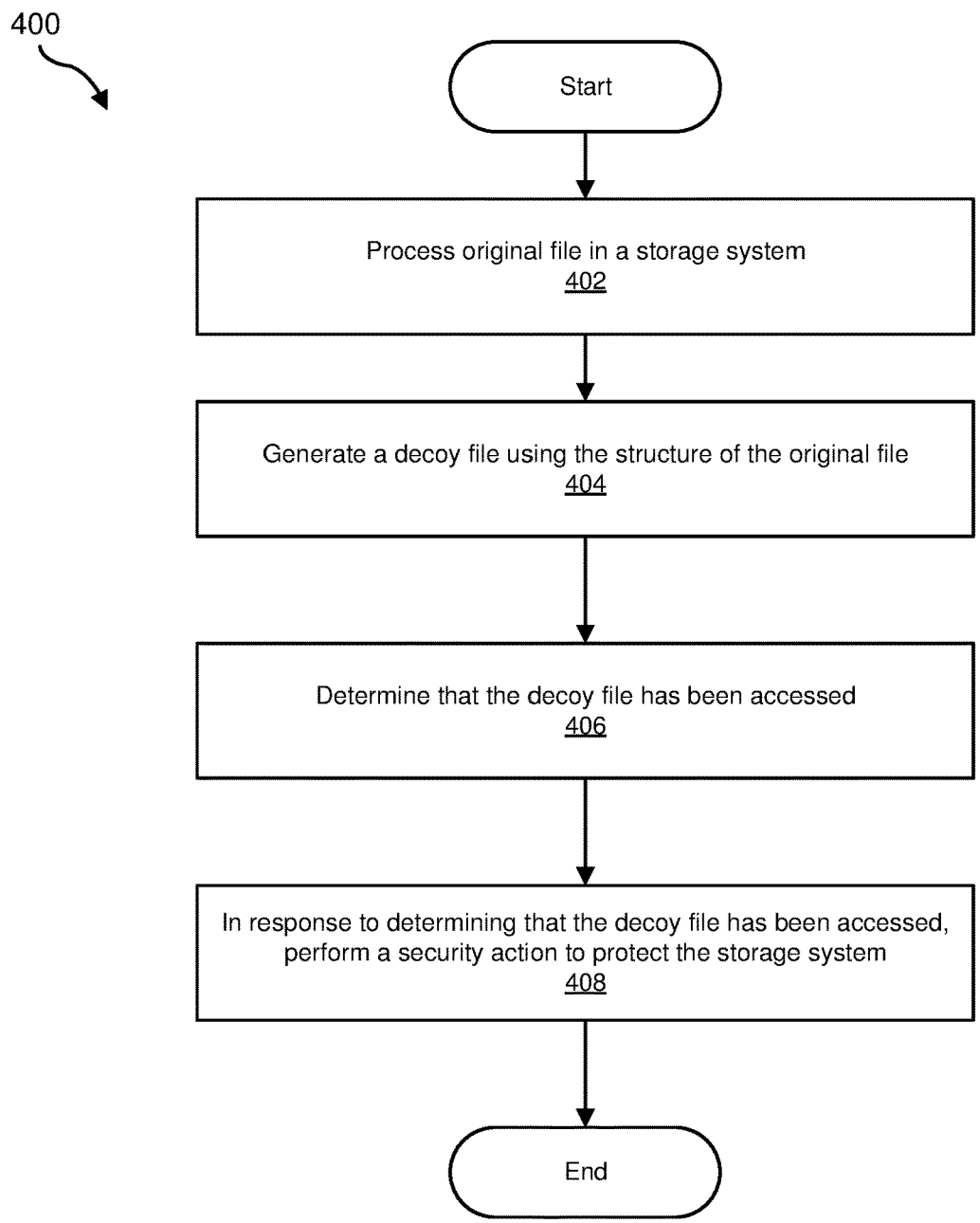
FIG. 4 is a flow diagram of another example method for protection of storage systems using decoy data.
Figure 5:
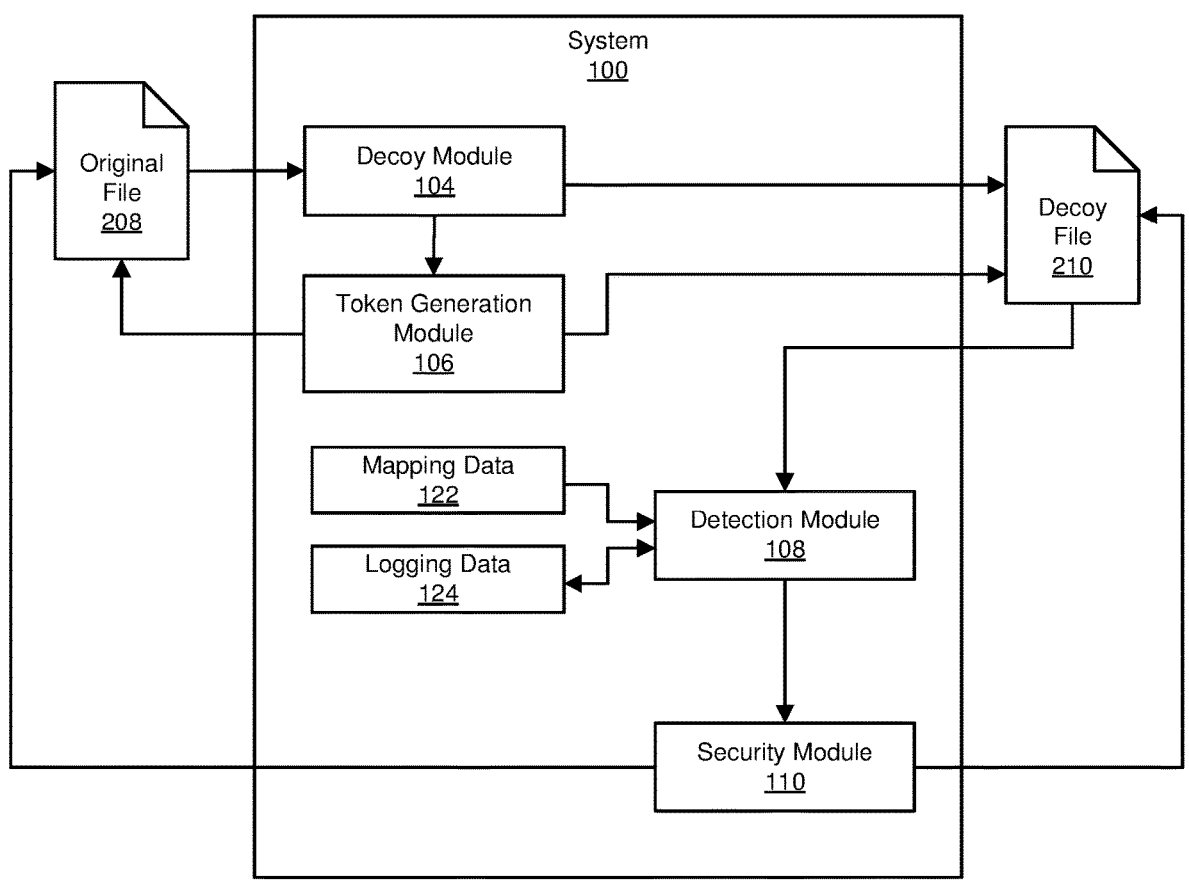
FIG. 5 is a data flow diagram of an example system for protection of storage systems using decoy data.

FIG. 4 is a flow diagram of an example computer-implemented method 400 for protection of storage systems using decoy data. The steps shown in FIG. 4 may be performed by any suitable computer-executable code and/or computing system, including the system 100 in FIG. 1, the system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402, one or more of the systems described herein may process an original file 208 in a storage system. The system may obtain the original file in any suitable manner. For example, the decoy module 104 may, as part of computing device 202 in FIG. 2, receive a location of the original file 208 from a user or administrator. The decoy module 104 may process the original file 208 to obtain a structure of the original file 208. As discussed in relation to FIG. 3, the decoy module 104 may parse the markup data of the original file 208 or use other processing techniques, such as natural language processing, to identify a structure of the original file 208. In some examples, the decoy module 104 may parse the markup data of the original file 208 and identify data indicative of the structure of the original file 208, such as the arrangement, organization, and/or presentation of the content in the original file 208. The decoy module 104 may flag locations of different types of entities in the content of the original file 208. The decoy module 104 may determine which of the entities are sensitive content entities based on their structure, form, or other attribute of the content.

Entities of the content may be identified using different techniques, such as regular expressions, database cross-referencing, and/or natural language processing algorithms. In some examples, the systems and methods described herein may use a set of rules indicating format or structure of the content, use natural language processing to identify entities from the content of the original file 208, and/or obtain information from the markup of the original file 208 that denotes the presence and location of an entity.

At step 404, one or more of the systems described herein may generate a decoy file 210 using the structure of the original file 208. The system may generate the decoy file in any suitable manner. For example, the decoy module 104 may, as part of computing device 202 in FIG. 2, use the data indicative of the structure of the original file 208 to generate the decoy file 210.

In some examples, the decoy module 104 may generate a configurable number of decoy files 210, based on a user preference. If the configurable number is designated as three, for every original file 208 processed by the decoy module 104, three decoy files 210 may be generated. The decoy files 210 may be generated synchronously or asynchronously to the processing of the original file 208. For example, a user may select one or more original files 208 to process. The decoy module 104 may generate the decoy files 210 at the same or nearly the same time as the original file 208 is being processed. In some examples, the original file 208 may be processed to obtain the structure of the file and presence and location of the entities of the content. The decoy module 104 may generate the decoy files 210 at a later time. For example, the generation of the decoy files 210 may be based on time or a threshold number of original files 208 located in a directory.

In some examples, the decoy module 104 may generate the decoy file 210 using the structure obtained from the original file 208. The decoy module 104 may identify locations in the decoy file 210 that require decoy data. For example, if the original file 208 is a form with content (e.g., instructions, descriptions of information requested from a user, etc.), and fields that store sensitive content (e.g., user-provided personally identifiable information), the decoy file 210 may include the content and locations where decoy data should be inserted to mimic the sensitive content. In some examples, the locations where the decoy data should be inserted may be obtained from processing the original file 208. The decoy module 104 may identify sensitive content entities of the content of the original file 208 and flag locations where substitutions should be made for sensitive content.

In some examples, the decoy module 104 may communicate with the token generation module 106 and may receive contextualized tokens to insert into the decoy file 210. Contextualization of tokens may include using characteristics and/or attributes of the sensitive content to generate decoy data that is similar to the sensitive content. Examples may include using geographic cues (e.g., addresses from a specific geographic region, area codes of phone numbers corresponding to geographic regions, names common in a geographic region, etc.), attributes of a person (e.g., gender, age, physical attributes, etc.), or the like.

The token generation module 106 may use rules and/or formulas to generate decoy data that appears to be similar to that of the sensitive content. This may include applying a specific formatting to the decoy data (e.g., social security number format, name format, etc.), using rules to ensure that the decoy data is consistent in form as the sensitive data (e.g., rules provided by a credit card provider to apply to a string of numbers enable a formulaic check to ensure the string of numbers is in valid form), and the like.

The token generation module 106 may generate mapping date 122 to link the sensitive content, the token, and the decoy file 210. The mapping data 122 may be used to prevent decoy files 210 using the same tokens or decoy data or using decoy data that is too similar to each other.

The token generation module 106 may transmit the token to the decoy module 104. The decoy module 104 may insert the token in the location of the sensitive content entities in the original file 208. The decoy module 104 may then store the decoy file 210 in the same location as the original file 208.

In some examples, the decoy module 104 may insert beaconing instructions in the decoy file 210. The beaconing instructions may initiate transmission of an alert to a designated user if the decoy file 210 is accessed. The alert may include additional information, such as date of the access, location of the decoy file 210, information about the user that accessed the decoy file 210, and the like.

In some examples, the decoy module 104 may modify metadata associated with the decoy file 210. For example, the decoy module 104 may modify metadata to vary the creation dates or dates of access associated with different decoy files 210. This may be done to avoid batch generated decoy files 210 all having the same date of creation or access dates, which may arouse the suspicion of malicious user. Additionally, the decoy module 104 may update the metadata to indicate recent access of decoy files 210. In some examples, the metadata may be modified in response to the original file 208 being accessed by a user. Updating the metadata of the decoy files 210 may provide further security because malicious users may not be able to distinguish between the original file 208 and the decoy file 210 based on reviewing the metadata associated with the files.

In some examples, systems and methods described herein may be applied to database records. The decoy module 104 may process database records and may generate decoy database records that are inserted into the database. A user may designate one or more elements of the database records as sensitive content and may request the generation of decoy records based on different factors. For example, decoy records may be generated and distributed evenly by row numbers to avoid cluster of decoy records in the database that may be easily identified by a malicious user. For example, user may designate a uniform, random, or skewed distribution of decoy database records. A uniform distribution may indicate a consistent or regular distribution of decoy database records among the original database records. A random distribution of decoy database records may indicate randomly inserting decoy database records into the database among the original database records. A skewed distribution of decoy database records may indicate the generation of decoy database records with similar values as a designated metric of the original database record. Because the decoy database records have similar values for the designated metric element original database record, the insertion of the decoy database records may be skewed, as they will likely be inserted near the original database record, thus resulting in a skewed distribution.

At step 406, one or more of the systems described herein may determine that the decoy file 210 has been accessed. The system may perform this step in any suitable manner. For example, the detection module 108 may, as part of computing device 202 in FIG. 2, determine that the decoy file 210 has been accessed. In some examples, the detection module 108 may determine that the decoy file 210 has been accessed by identifying that a user opened the decoy file 210, identifying that the user copied the decoy file 210, and/or identifying that the user deleted the decoy file 210. In some examples, the detection module 108 may generate logging data 124. The logging data 124 may be data indicative of any activity associated with the original file 208 and/or the decoy file 210. For example, the logging data 124 may capture the date and time of the access of the files, the location of the file that was accessed, the user that accessed the files, actions taken by the user on the file (e.g., modification, copy, delete, etc.).

At step 408, one or more of the systems described herein may, in response to determining that the decoy file 210 has been accessed, perform a security action to protect the storage system. The system may perform this step in any suitable manner. For example, the security module 110 may, as part of computing device 202 in FIG. 2, perform a security action to protect the storage system.

In some examples, the security module 110 may track the number of decoy files 210 accessed and may perform a designated security action when a threshold number of decoy files 210 have been accessed within a specified window of time. The threshold number (and window of time) may be configurable by an administrator, may be based on the type associated with the original file 208, or the like.

In some examples, the security action may be to display, to an administrator of the storage system, an alert indicating that the decoy file 210 has been accessed. The display may be a pop-up alert, overlay, push notification, email, text, or the like. The security action may include moving the original file 208 from a current location in the storage system to a location outside of the storage system or moving the original file 208 to a secure location within the storage system. The security action may include encrypting the original file 208 and the decoy file 210 in the storage system.

In some examples, the security action may include terminating the session of the user accessing the decoy file 210 and/or suspending the credentials of the user access the decoy file 210. In some examples, the security module 110 may activate loss prevention protocols, which may include redacting identified content entities in the original files 208 and the decoy files 210.

The example system 100 in FIG. 1 may be implemented in a variety of ways. For example, all or a portion of the example system 100 may represent portions of the system 500 in FIG. 5. As will be described in greater detail below, one or more of the modules 102 from FIG. 1 may, when executed by at least one processor of the computing device 202, enable the system 100 to protect storage systems using decoy data. For example, and as will be described in greater detail herein, one or more of the modules 102 may cause the example system 100 to identify, by the decoy module 104, an original file 208. The original file may include sensitive content to be protected against malicious access. The decoy module 104 may process the original file 208 to identify a structure of the original file 208 and to identify the sensitive content of the original file 208. The decoy module 104 may generate a decoy file 210 using the structure of the original file 208.

The token generation module 106 may generate substitute content that corresponds to the sensitive content of the original file 208. The decoy module 104 may use the substitute content in the decoy file 210 in a location corresponding to the sensitive content of the original file 208. The decoy module 104 may store the decoy file 210 with the original file 208. The detection module 108 may use mapping data 122 and/or logging data 124 to determine that the decoy file 210 has been accessed. In response to detecting that the decoy file 210 has been accessed, the security module 110 may perform a security action. In some examples, the security action may include, but is not limited to, notifying an administrator of the system of the access, removing the original file 208 from its current location in the storage system, and/or encrypting the original file 208 and/or decoy file 210.

In some examples, an authorized user may wish to access the original file 208. The authorized user may authenticate themselves using known security protocols, such as two factor authentication or the like. Upon authentication, the authorized user may request access to original files 208 in a directory. The decoy module 104 may receive the request and may generate a list of original files 208 in the directory, excluding the decoy files 210. The decoy module 104 provide access to the original file 208 in response the authorized user's request. In some examples, the list of original files 208 may be stored in a location outside of the storage system and/or in a secure location with limited access in the storage system. The list of original files 208 may be encrypted using any known encryption techniques to provide further protection.

The systems and methods described herein are directed to protecting storage systems using decoy data. Original files stored in a data storage system may be processed to obtain a structure and to identify the location of sensitive content entities. Decoy files may be generated using the structure of the original files and decoy data in the place of the sensitive content entities in the original files. The decoy files may be stored with the original files. Intermingling the decoy files and original files in the data storage system may thwart intruders and increase the likelihood that the intruder accesses useless decoy data. Intruders may waste time trying to distinguish the decoy documents from the original documents. The systems and methods herein may utilize the information gathered about the intruder and the access of the decoy files to take remedial action and further protect the original files.

Figure 6:
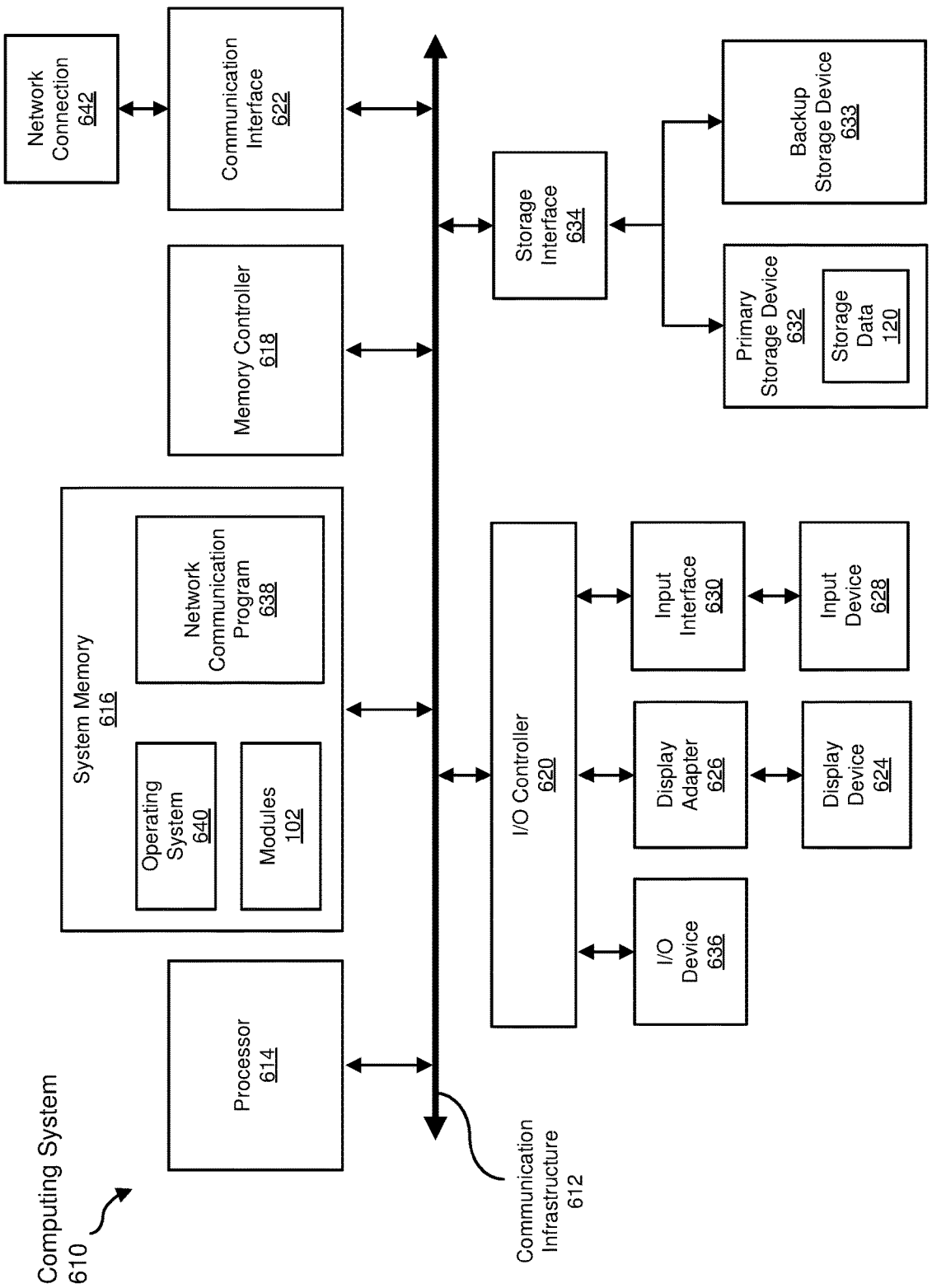
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of the computing system 610 may perform and/or be a means for performing, either alone or in combination with other elements, one or more of the steps described herein (such as one or more of the steps illustrated in FIG. 3). All or a portion of the computing system 610 may also perform and/or be a means for performing any other steps, methods, or processes described and/or illustrated herein.

The computing system 610 broadly represents any single or multi-processor computing device or system capable of executing computer-readable instructions. Examples of the computing system 610 include, without limitation, workstations, laptops, client-side terminals, servers, distributed computing systems, handheld devices, or any other computing system or device. In its most basic configuration, the computing system 610 may include at least one processor 614 and a system memory 616.

The processor 614 generally represents any type or form of physical processing unit (e.g., a hardware-implemented central processing unit) capable of processing data or interpreting and executing instructions. In certain embodiments, the processor 614 may receive instructions from a software application or module. These instructions may cause the processor 614 to perform the functions of one or more of the example embodiments described and/or illustrated herein.

The system memory 616 generally represents any type or form of volatile or non-volatile storage device or medium capable of storing data and/or other computer-readable instructions. Examples of the system memory 616 include, without limitation, Random Access Memory (RAM), Read Only Memory (ROM), flash memory, or any other suitable memory device. Although not required, in certain embodiments the computing system 610 may include both a volatile memory unit (such as, for example, the system memory 616) and a non-volatile storage device (such as, for example, the primary storage device 632, as described in detail below). In one example, one or more of the modules 102 from FIG. 1 may be loaded into the system memory 616.

In some examples, the system memory 616 may store and/or load an operating system 640 for execution by the processor 614. In one example, the operating system 640 may include and/or represent software that manages computer hardware and software resources and/or provides common services to computer programs and/or applications on the computing system 610. Examples of the operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, the example computing system 610 may also include one or more components or elements in addition to the processor 614 and the system memory 616. For example, as illustrated in FIG. 6, the computing system 610 may include a memory controller 618, an Input/Output (I/O) controller 620, and a communication interface 622, each of which may be interconnected via a communication infrastructure 612. The communication infrastructure 612 generally represents any type or form of infrastructure capable of facilitating communication between one or more components of a computing device. Examples of the communication infrastructure 612 include, without limitation, a communication bus (such as an Industry Standard Architecture (ISA), Peripheral Component Interconnect (PCI), PCI Express (PCIe), or similar bus) and a network.

The memory controller 618 generally represents any type or form of device capable of handling memory or data or controlling communication between one or more components of the computing system 610. For example, in certain embodiments, the memory controller 618 may control communication between the processor 614, the system memory 616, and the I/O controller 620 via the communication infrastructure 612.

The I/O controller 620 generally represents any type or form of module capable of coordinating and/or controlling the input and output functions of a computing device. For example, in certain embodiments, the I/O controller 620 may control or facilitate transfer of data between one or more elements of the computing system 610, such as the processor 614, the system memory 616, the communication interface 622, the display adapter 626, the input interface 630, and the storage interface 634.

As illustrated in FIG. 6, the computing system 610 may also include at least one display device 624 coupled to the I/O controller 620 via a display adapter 626. The display device 624 generally represents any type or form of device capable of visually displaying information forwarded by the display adapter 626. Similarly, the display adapter 626 generally represents any type or form of device configured to forward graphics, text, and other data from the communication infrastructure 612 (or from a frame buffer, as known in the art) for display on the display device 624.

As illustrated in FIG. 6, the example computing system 610 may also include at least one input device 628 coupled to the I/O controller 620 via an input interface 630. The input device 628 generally represents any type or form of input device capable of providing input, either computer or human generated, to the example computing system 610. Examples of the input device 628 include, without limitation, a keyboard, a pointing device, a speech recognition device, variations or combinations of one or more of the same, and/or any other input device.

Additionally, or alternatively, the example computing system 610 may include additional I/O devices. For example, the example computing system 610 may include the I/O device 636. In this example, the I/O device 636 may include and/or represent a user interface that facilitates human interaction with the computing system 610. Examples of the I/O device 636 include, without limitation, a computer mouse, a keyboard, a monitor, a printer, a modem, a camera, a scanner, a microphone, a touchscreen device, variations or combinations of one or more of the same, and/or any other I/O device.

The communication interface 622 broadly represents any type or form of communication device or adapter capable of facilitating communication between the example computing system 610 and one or more additional devices. For example, in certain embodiments, the communication interface 622 may facilitate communication between the computing system 610 and a private or public network including additional computing systems. Examples of the communication interface 622 include, without limitation, a wired network interface (such as a network interface card), a wireless network interface (such as a wireless network interface card), a modem, and any other suitable interface. In at least one embodiment, the communication interface 622 may provide a direct connection to a remote server via a direct link to a network, such as the Internet. The communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, the communication interface 622 may also represent a host adapter configured to facilitate communication between the computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. The communication interface 622 may also allow the computing system 610 to engage in distributed or remote computing. For example, the communication interface 622 may receive instructions from a remote device or send instructions to a remote device for execution.

In some examples, the system memory 616 may store and/or load a network communication program 638 for execution by the processor 614. In one example, the network communication program 638 may include and/or represent software that enables the computing system 610 to establish a network connection 642 with another computing system (not illustrated in FIG. 6) and/or communicate with the other computing system by way of the communication interface 622. In this example, the network communication program 638 may direct the flow of outgoing traffic that is sent to the other computing system via the network connection 642. Additionally, or alternatively, the network communication program 638 may direct the processing of incoming traffic that is received from the other computing system via the network connection 642 in connection with the processor 614.

Although not illustrated in this way in FIG. 6, the network communication program 638 may alternatively be stored and/or loaded in the communication interface 622. For example, the network communication program 638 may include and/or represent at least a portion of software and/or firmware that is executed by a processor and/or Application Specific Integrated Circuit (ASIC) incorporated in the communication interface 622.

As illustrated in FIG. 6, the example computing system 610 may also include a primary storage device 632 and a backup storage device 633 coupled to the communication infrastructure 612 via a storage interface 634. The storage devices 632 and 633 generally represent any type or form of storage device or medium capable of storing data and/or other computer-readable instructions. For example, the storage devices 632 and 633 may be a magnetic disk drive (e.g., a so-called hard drive), a solid state drive, a floppy disk drive, a magnetic tape drive, an optical disk drive, a flash drive, or the like. The storage interface 634 generally represents any type or form of interface or device for transferring data between the storage devices 632 and 633 and other components of the computing system 610. In one example, the data storage 120 from FIG. 1 may be stored and/or loaded in the primary storage device 632.

In certain embodiments, the storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 632 and 633 may also include other similar structures or devices for allowing computer software, data, or other computer-readable instructions to be loaded into the computing system 610. For example, the storage devices 632 and 633 may be configured to read and write software, data, or other computer-readable information. The storage devices 632 and 633 may also be a part of the computing system 610 or may be a separate device accessed through other interface systems.

Many other devices or subsystems may be connected to the computing system 610. Conversely, all of the components and devices illustrated in FIG. 6 need not be present to practice the embodiments described and/or illustrated herein. The devices and subsystems referenced above may also be interconnected in different ways from that shown in FIG. 6. The computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into the computing system 610. All or a portion of the computer program stored on the computer-readable medium may then be stored in the system memory 616 and/or various portions of the storage devices 632 and 633. When executed by the processor 614, a computer program loaded into the computing system 610 may cause the processor 614 to perform and/or be a means for performing the functions of one or more of the example embodiments described and/or illustrated herein. Additionally, or alternatively, one or more of the example embodiments described and/or illustrated herein may be implemented in firmware and/or hardware. For example, the computing system 610 may be configured as an Application Specific Integrated Circuit (ASIC) adapted to implement one or more of the example embodiments disclosed herein.

Figure 7:
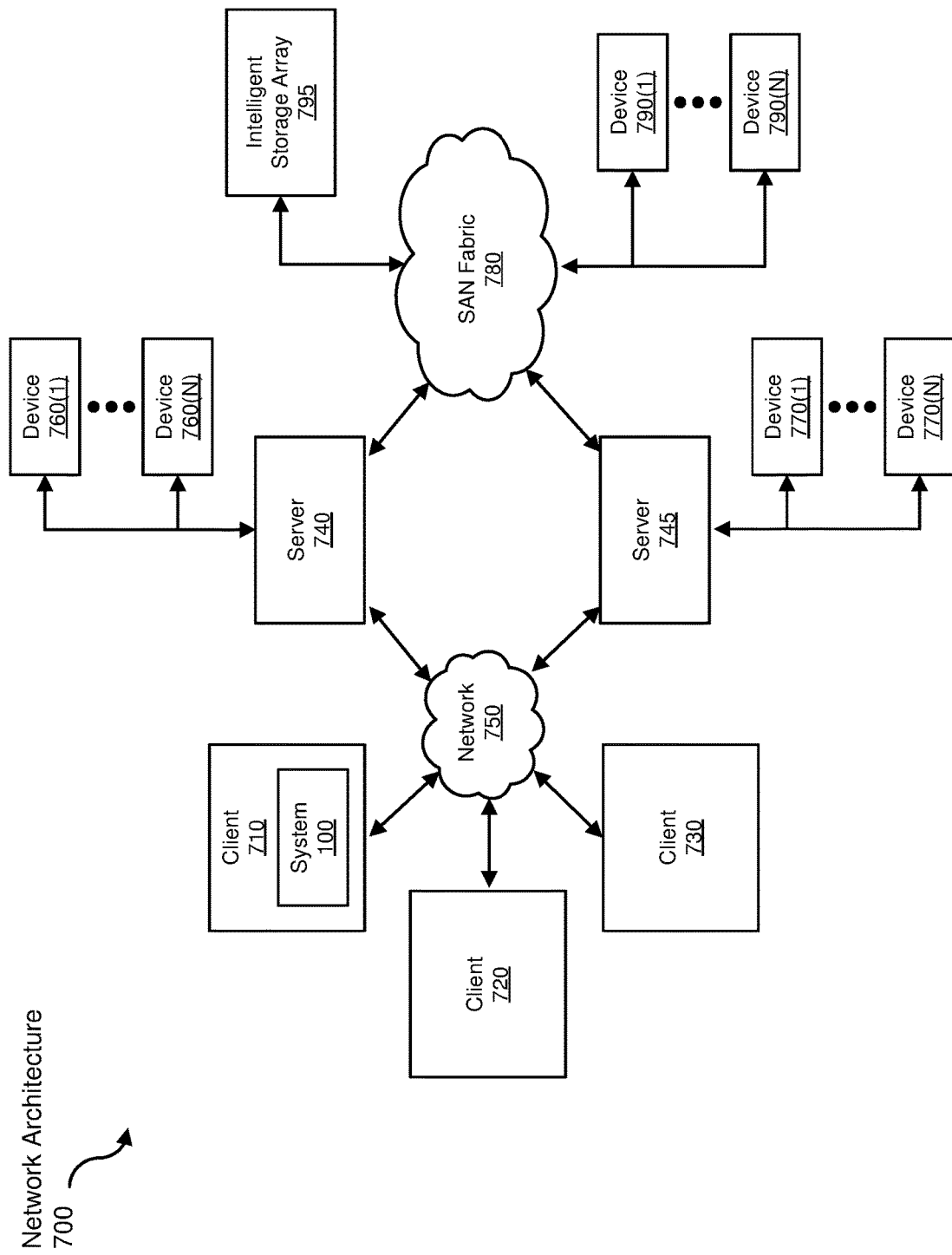
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of the network architecture 700 may perform and/or be a means for performing, either alone or in combination with other elements, one or more of the steps disclosed herein (such as one or more of the steps illustrated in FIG. 3). All or a portion of the network architecture 700 may also be used to perform and/or be a means for performing other steps and features set forth in the present disclosure.

The client systems 710, 720, and 730 generally represent any type or form of computing device or system, such as the example computing system 610 in FIG. 6. Similarly, the servers 740 and 745 generally represent computing devices or systems, such as application servers or database servers, configured to provide various database services and/or run certain software applications. The network 750 generally represents any telecommunication or computer network including, for example, an intranet, a WAN, a LAN, a PAN, or the Internet. In one example, the client systems 710, 720, and/or 730 and/or servers 740 and/or 745 may include all or a portion of the system 100 from FIG. 1.

As illustrated in FIG. 7, one or more storage devices 760(1)-(N) may be directly attached to the server 740. Similarly, the one or more storage devices 770(1)-(N) may be directly attached to the server 745. The storage devices 760(1)-(N) and the storage devices 770(1)-(N) generally represent any type or form of storage device or medium capable of storing data and/or other computer-readable instructions. In certain embodiments, the storage devices 760(1)-(N) and the storage devices 770(1)-(N) may represent Network-Attached Storage (NAS) devices configured to communicate with the servers 740 and 745 using various protocols, such as Network File System (NFS), Server Message Block (SMB), or Common Internet File System (CIFS).

The servers 740 and 745 may also be connected to a Storage Area Network (SAN) fabric 780. The SAN fabric 780 generally represents any type or form of computer network or architecture capable of facilitating communication between a plurality of storage devices. The SAN fabric 780 may facilitate communication between the servers 740 and 745 and a plurality of the storage devices 790(1)-(N) and/or an intelligent storage array 795. The SAN fabric 780 may also facilitate, via the network 750 and the servers 740 and 745, communication between the client systems 710, 720, and 730 and the storage devices 790(1)-(N) and/or the intelligent storage array 795 in such a manner that the devices 790(1)-(N) and the array 795 appear as locally attached devices to the client systems 710, 720, and 730. As with the storage devices 760(1)-(N) and the storage devices 770(1)-(N), the storage devices 790(1)-(N) and the intelligent storage array 795 generally represent any type or form of storage device or medium capable of storing data and/or other computer-readable instructions.

In certain embodiments, and with reference to the example computing system 610 of FIG. 6, a communication interface, such as the communication interface 622 in FIG. 6, may be used to provide connectivity between each client system 710, 720, and 730 and the network 750. The client systems 710, 720, and 730 may be able to access information on the server 740 or 745 using, for example, a web browser or other client software. Such software may allow the client systems 710, 720, and 730 to access data hosted by the server 740, the server 745, the storage devices 760(1)-(N), the storage devices 770(1)-(N), the storage devices 790(1)-(N), or the intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by the server 740, the server 745, the storage devices 760(1)-(N), the storage devices 770(1)-(N), the storage devices 790(1)-(N), the intelligent storage array 795, or any combination thereof. All or a portion of one or more of the example embodiments disclosed herein may also be encoded as a computer program, stored in the server 740, run by the server 745, and distributed to the client systems 710, 720, and 730 over the network 750.

As detailed above, the computing system 610 and/or one or more components of the network architecture 700 may perform and/or be a means for performing, either alone or in combination with other elements, one or more steps of an example method for protection of storage systems using decoy data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of the example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of the example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of the example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of the example system 100 in FIG. 1 may represent portions of a mobile computing environment. The mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, the mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of the example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protection of storage systems using decoy data, at least a portion of the method being performed by a computing device comprising at least one processor, the method comprising:
   identifying, by a computing device, an original file comprising sensitive content to be protected against malicious access; and
   protecting the sensitive content by:
      processing the original file to identify a structure of the original file and the sensitive content of the original file;
      generating a decoy file using the structure of the original file and using substitute content in a location corresponding to the sensitive content of the original file; and
      storing the decoy file with the original file in a current location in a storage system;
   determining that the decoy file has been accessed; and
   in response to determining that the decoy file has been accessed, moving the original file from the current location in the storage system.

2. The computer-implemented method of claim 1, further comprising, in response to determining that the decoy file has been accessed, performing at least one of:
   encrypting the original file and the decoy file in the storage system;
   terminating a session of a user accessing the decoy file;
   suspending credentials of the user accessing the decoy file; or
   redacting the sensitive content from the original file.

3. The computer-implemented method of claim 1, generating the decoy file using the structure of the original file and using the substitute content further comprises:
   obtaining a user preference indicating a ratio of the original file to a number of decoy files; and
   generating, based on the ratio, a plurality of decoy files using the structure of the original file and using with the substitute content in the location corresponding to the sensitive content of the original file.

4. The computer-implemented method of claim 1, wherein processing the original file to identify the structure of the original file and the sensitive content of the original file further comprises:
   identifying an entity associated with the sensitive content, wherein the entity is indicative of a category of sensitive content; and
   identifying a location associated with the entity of the sensitive content.

5. The computer-implemented method of claim 4, wherein generating the decoy file using the structure of the original file and using the substitute content in the location corresponding to the sensitive content of the original file further comprises:
   generating the decoy file using the structure of the original file;
   generating the substitute content based on the entity of the sensitive content; and
   inserting the substitute content at the location associated with the entity of the sensitive content in the decoy file.

6. The computer-implemented method of claim 4, further comprising:
   generating a token based on the entity of the sensitive content; and
   substituting the sensitive content with the token at the location of the entity in the original file.

7. The computer-implemented method of claim 1, wherein determining that the decoy file has been accessed further comprises at least one of:
   identifying that a user opened the decoy file;
   identifying that the user copied the decoy file; or
   identifying that the user deleted the decoy file.

8. A system for protection of storage systems using decoy data, the system comprising:
   at least one physical processor;
   physical memory comprising computer-executable instructions that, when executed by the physical processor, cause the physical processor to:
      identify an original file comprising sensitive content to be protected against malicious access; and
      protect the sensitive content, wherein the computer-executable instructions cause the physical processor to:
         process the original file to identify a structure of the original file and the sensitive content of the original file;
         generate a decoy file using the structure of the original file and using substitute content in a location corresponding to the sensitive content of the original file; and
         store the decoy file with the original file in a current location in a storage system;
      determine that the decoy file has been accessed; and
      in response to determining that the decoy file has been accessed, move the original file from the current location in the storage system.

9. The system of claim 8, wherein the computer-executable instructions further cause the physical processor to, in response to determining that the decoy file has been accessed, perform at least one of:
   encrypting the original file and the decoy file in the storage system;
   terminating a session of a user accessing the decoy file;
   suspending credentials of the user accessing the decoy file; or
   redacting the sensitive content from the original file.

10. The system of claim 8, wherein, to generate the decoy file using the structure of the original file and using the substitute content, the computer-executable instructions further cause the physical processor to:
    obtain a user preference indicating a ratio of the original file to a number of decoy files; and
    generate, based on the ratio, a plurality of decoy files using the structure of the original file and using with the substitute content in the location corresponding to the sensitive content of the original file.

11. The system of claim 8, wherein, to process the original file to identify the structure of the original file and the sensitive content of the original file, the computer-executable instructions further cause the physical processor to:
    identify an entity associated with the sensitive content, wherein the entity is indicative of a category of the sensitive content; and identify a location associated with the entity of the sensitive content.

12. The system of claim 11, wherein, to generate the decoy file using the structure of the original file and using the substitute content in the location corresponding to the sensitive content of the original file, the computer-executable instructions further cause the physical processor to:
generate the decoy file using the structure of the original file;
generate the substitute content based on the entity of the sensitive content; and
insert the substitute content at the location associated with the entity of the sensitive content in the decoy file.

13. The system of claim 11, wherein the computer-executable instructions further cause the physical processor to:
generate a token based on the entity of the sensitive content; and
substitute the sensitive content with the token at the location of the entity in the original file.

14. The system of claim 8, wherein, to determine that the decoy file has been accessed, the computer-executable instructions further cause the physical processor to at least one of:
identify that a user opened the decoy file;
identify that the user copied the decoy file; or
identify that the user deleted the decoy file.

15. A non-transitory computer-readable medium comprising one or more computer-executable instructions that, when executed by at least one processor of a computing device, cause the computing device to:
identify an original file comprising sensitive content to be protected against malicious access; and
protect the sensitive content, wherein the one or more computer-executable instructions cause the computing device to:
process the original file to identify a structure of the original file and the sensitive content of the original file;
generate a decoy file using the structure of the original file and using substitute content in a location corresponding to the sensitive content of the original file; and
store the decoy file with the original file in a current location in a storage system;
determine that the decoy file has been accessed; and
in response to determining that the decoy file has been accessed, move the original file from the current location in the storage system.

16. The non-transitory computer-readable medium of claim 15, wherein the one or more computer-executable instructions further cause the computing device to, in response to determining that the decoy file has been accessed, perform at least one of:
encrypting the original file and the decoy file in the storage system;
terminating a session of a user accessing the decoy file;
suspending credentials of the user accessing the decoy file; or
redacting the sensitive content from the original file.

17. The non-transitory computer-readable medium of claim 15, wherein, to generate the decoy file using the structure of the original file and using the substitute content, the one or more computer-executable instructions further cause the computing device to:
obtain a user preference indicating a ratio of the original file to a number of decoy files; and
generate, based on the ratio, a plurality of decoy files using the structure of the original file and using with the substitute content in the location corresponding to the sensitive content of the original file.

18. A computer-implemented method for protection of storage systems using decoy data, at least a portion of the method being performed by a computing device comprising at least one processor, the method comprising:
identifying, by a computing device, an original file comprising sensitive content to be protected against malicious access; and
protecting the sensitive content by:
processing the original file to identify a structure of the original file and the sensitive content of the original file;
generating a decoy file using the structure of the original file and using substitute content in a location corresponding to the sensitive content of the original file; and
storing the decoy file with the original file in a current location in a storage system;
determining that the decoy file has been accessed; and
in response to determining that the decoy file has been accessed, encrypting the original file and the decoy file in the storage system.

19. The computer-implemented method of claim 18, generating the decoy file using the structure of the original file and using the substitute content further comprises:
obtaining a user preference indicating a ratio of the original file to a number of decoy files; and
generating, based on the ratio, a plurality of decoy files using the structure of the original file and using with the substitute content in the location corresponding to the sensitive content of the original file.

20. The computer-implemented method of claim 18, wherein processing the original file to identify the structure of the original file and the sensitive content of the original file further comprises:
identifying an entity associated with the sensitive content, wherein the entity is indicative of a category of sensitive content; and
identifying a location associated with the entity of the sensitive content.

* * * * *